US011069896B2

(12) United States Patent
Moganty et al.

(10) Patent No.: US 11,069,896 B2
(45) Date of Patent: Jul. 20, 2021

(54) PROTECTIVE COATING OF METAL

(71) Applicant: NOHMs Technologies, Inc., Rochester, NY (US)

(72) Inventors: Surya Sekhar Moganty, Henrietta, NY (US); Michel Frantz Molaire, Rochester, NY (US)

(73) Assignee: NOHMS TECHNOLOGIES, INC., Rochester, NY (US)

( * ) Notice: Subject to any disclaimer, the term of this patent is extended or adjusted under 35 U.S.C. 154(b) by 62 days.

(21) Appl. No.: 14/795,465

(22) Filed: Jul. 9, 2015

(65) Prior Publication Data
US 2016/0164102 A1 Jun. 9, 2016

Related U.S. Application Data

(60) Provisional application No. 61/990,960, filed on May 9, 2014.

(51) Int. Cl.
*H01M 4/62* (2006.01)
*H01M 4/38* (2006.01)
*H01M 4/36* (2006.01)
*H01M 4/04* (2006.01)
*H01M 4/134* (2010.01)
(Continued)

(52) U.S. Cl.
CPC ......... *H01M 4/628* (2013.01); *H01M 4/0402* (2013.01); *H01M 4/134* (2013.01); *H01M 4/366* (2013.01); *H01M 4/38* (2013.01); *H01M 4/381* (2013.01); *H01M 4/382* (2013.01); *B82Y 30/00* (2013.01); *H01M 2004/027* (2013.01)

(58) Field of Classification Search
CPC ........... H01M 2004/027; H01M 4/628; H01M 4/134; H01M 4/381; H01M 4/382; H01M 4/38; H01M 4/366; H01M 4/0402; H01M 4/40; H01M 4/405; B32B 15/00; B32B 15/04; B82Y 30/00; H01G 11/66; H01G 11/30; H01G 11/50
See application file for complete search history.

(56) References Cited

U.S. PATENT DOCUMENTS 4,830,939 A * 5/1989 Lee ..................... C08F 299/022
429/312
4,908,283 A * 3/1990 Takahashi ............ H01M 6/181
429/217
(Continued)

FOREIGN PATENT DOCUMENTS

CN 103066323 * 4/2013 ........ H01M 10/0565
ES 2462841 * 5/2014 ............. B04D 69/10
(Continued)

OTHER PUBLICATIONS

Marchioni et al. Langmiur 2007 vol. 23 pp. 11597-11602.*
(Continued)

*Primary Examiner* — Cynthia H Kelly
*Assistant Examiner* — Aaron J Greso
(74) *Attorney, Agent, or Firm* — Bond, Schoeneck & King, PLLC; Joseph Noto

(57) ABSTRACT

This invention is directed to a hydrophobic, ionically-conductive coating for a metal surface comprising a plurality of organic surface moieties covalently bound to the metal surface, and at least one ionic liquid nanoscale ionic material tethered to at least one surface moiety.

14 Claims, 5 Drawing Sheets

(51) Int. Cl.
*H01M 4/02* (2006.01)
*B82Y 30/00* (2011.01)

(56) References Cited

U.S. PATENT DOCUMENTS

| | | | | | |
|---|---|---|---|---|---|
| 5,354,631 | A | * | 10/1994 | Chaloner-Gill | H01M 4/13 |
| | | | | | 29/623.5 |
| 2005/0095504 | A1 | * | 5/2005 | Kim | H01M 2/1673 |
| | | | | | 429/246 |
| 2008/0069944 | A1 | * | 3/2008 | Muldoon | C09D 4/00 |
| | | | | | 427/58 |
| 2016/0164137 | A1 | * | 6/2016 | Moganty | H01M 10/0525 |
| | | | | | 429/306 |

FOREIGN PATENT DOCUMENTS

| | | | | | |
|---|---|---|---|---|---|
| JP | 2012009158 | * | 1/2012 | | H01M 10/0568 |
| JP | 2012074351 | * | 4/2012 | | H01M 10/056 |
| KR | 20140046611 | * | 4/2014 | | H01M 10/0565 |

OTHER PUBLICATIONS

Kim et al. (KR 20140046611) Google English Machine Translation printed May 28, 2019.*
ES 2462841 Derwnt Abstract May 26, 2014.*
ES 2462841 Espacenet English Machine translation May 26, 2014.*

* cited by examiner

PROTECTIVE COATING OF METAL

CROSS REFERENCE TO RELATED APPLICATIONS

This application is related to, and derives priority from U.S. Provisional Patent Application Ser. No. 61/990,960, filed May 9, 2014, and entitled Protective Coating of Materials, the content of which application is incorporated herein fully by reference.

TECHNICAL FIELD

The present invention relates to the anode of a secondary lithium sulfur battery. More particularly, the invention relates to a hydrophobic, ionically-conductive coating for a metal surface.

BACKGROUND OF THE INVENTION

This invention relates to negative electrodes for use in batteries (e.g., lithium electrodes for use in lithium-sulfur batteries). More particularly, this invention relates to alkali metal electrodes having a radiation cured polymeric layer.

The rapid proliferation of portable electronic devices in the international marketplace has led to a corresponding increase in the demand for advanced secondary batteries (i.e., rechargeable batteries). The miniaturization of such devices as, for example, cellular phones, laptop computers, etc., has naturally fueled the desire for rechargeable batteries having high specific energies (light weight). At the same time, mounting concerns regarding the environmental impact of throwaway technologies, has caused a discernible shift away from primary batteries and towards rechargeable systems.

Among the factors leading to the successful development of high specific energy batteries, is the fundamental need for high cell voltage and low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-explosive, non-toxic, and easy to process.

In theory, some alkali metals could provide very high energy density batteries. The low equivalent weight of lithium renders it particularly attractive as a battery electrode component. Lithium also provides greater energy per volume than does the traditional battery standards, nickel and cadmium. Unfortunately, no rechargeable lithium metal batteries have yet succeeded in the market place.

The failure of rechargeable lithium metal batteries is due in large measure to cell cycling problems. To be commercially viable, a lithium battery should recharge at least a hundred times. On repeated charge and discharge cycles, lithium "dendrites" gradually grow out from the lithium metal electrode, through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity.

To address some of the cycling problems observed with lithium metal electrodes, some researchers have developed lithium batteries employing a solid electrolyte, such as an ionically conductive polymer or ceramic. Note that most traditional batteries employ liquid electrolytes. It has been found that systems employing such solid electrolytes reduce the incidence of dendrites and mossy deposits. Unfortunately, solid electrolytes also possess a relatively low ionic conductivity (in comparison to liquid electrolytes), thereby reducing the high rate discharge (high power) performance of the battery.

To address lithium's poor cycling behavior in liquid electrolyte systems, some researchers have proposed that the electrolyte facing side of the lithium negative electrode be coated with a "protective layer." Such protective layer must conduct lithium ions, but at the same time prevent contact between the lithium electrode surface and the bulk electrolyte. Known protective layers all have certain difficulties.

Many lithium metal protective layers contemplated to date form in situ by reaction between lithium metal and compounds in the cell's electrolyte which contact the lithium. Most of these in situ films are grown by a controlled chemical reaction after the battery is assembled. Generally, such films are of poor quality, having a porous morphology allowing some electrolyte to penetrate to the bare lithium metal surface.

Some research have focused on pre-formed lithium protective layers. For example, U.S. Pat. No. 5,314,765 describes a lithium electrode containing a thin layer of sputtered lithium phosphorus oxynitride ("LiPON") or related material. LiPON is a glassy single ion (lithium ion) conductor which has been studied as a potential electrolyte for solid state lithium microbatteries that are fabricated on silicon and used to power integrated circuits (See U.S. Pat. Nos. 5,597,660, 5,567,210, 5,338,625, and 5,512,147). Unfortunately, sputtering is a cold process and so the sputtered LiPON layer may frequently be porous and have columnar structures, limiting its usefulness in protecting lithium.

Some research has focused on protecting the negative electrode using a glassy or amorphous surface protective layer, such as in U.S. Pat. Nos. 6,025,094; 6,402,795 and 6,723,140. The process for preparing the protective layer may involve forming directly on the wetting layer by such processes as physical vapor deposition and chemical vapor deposition.

Some research has further focused on an organic protection film formed over the metal anode layer, such as lithium pyrrolide, as in U.S. Pat. Appln publication No. US 20120003532. Also, other research has focused on a composition for protecting a negative electrode for lithium metal battery comprising a multifunctional monomer having at least two double bonds for facilitating cross linking, a plasticizer having epoxy groups, and at least one alkali metal salt, as in U.S. Pat. Appln publication No. 20050042515.

Lithium battery technology still lacks an effective mechanism for protecting lithium negative electrodes from degradation during extended cell cycling. Thus, before lithium metal batteries become commercially viable, such protective mechanism must be developed.

SUMMARY OF THE INVENTION

The negative electrodes of this invention resist formation of dendrites or mossy deposits on cycling and so they will typically provide rechargeable cells having a relatively long cycle life.

One aspect of the invention provides a hydrophobic, ionically-conductive coating for a metal surface comprising a plurality of organic surface moieties covalently bound to the metal surface, and at least one ionic liquid material tethered to at least one surface moiety.

In one or more embodiments, the metal may be an alkaline metal or an alkaline earth metal In an embodiment, the metal may be lithium, sodium, magnesium or aluminum.

In an embodiment, the metal surface to on which the coating is bounded is a lithium metal.

In an embodiment, the surface moiety is a ceramic particle.

In an embodiment, the ceramic particle is comprised of organometallic materials.

In an embodiment, the surface moiety has a particle size of from 5 nm to 1 um. In an embodiment, the surface moiety has a particle size of about 10 nm.

In an embodiment, the surface groups, or tethered surface moieties, are partially cross linked to ionic liquid materials.

In an embodiment, the ionic material is a nanoscale ionic material.

In an embodiment, the partially cross-linked liquid materials are nanoscale ionic materials.

In a further embodiment, the negative electrode also includes an electronically conductive backing intimately contacting a second surface of the alkali metal which is opposite the first surface of the alkali metal. This may function as a current collector when assembled in a battery. Examples of other suitable alkali metals for the electrode include lithium, sodium, alloys of lithium, and alloys of sodium, magnesium and aluminum.

The present invention also relates to a method of making a hydrophobic, ionically-conductive coating on a metal surface which comprises providing a metallic surface with binding sites; covalently bonding organic surface moieties to the binding sites; and tethering at least one ionic liquid material to at least one of the organic surface moieties. In an embodiment, the ionic liquid material may be a nanoscale ionic liquid material and/or the organic surface moieties may be a nanoscale organic surface moieties.

In an embodiment, the method of this invention comprises treating the metallic surface to increase the number of binding sites prior to binding (e.g., hydroxyl binding sites).

In an embodiment, the method of this invention provides for cross-linking the organic surface moieties.

In an embodiment, the method of this invention provides for using an initiator to tether ionic liquid material. In an embodiment, the ionic liquid material is a nanoscale ionic material.

In an embodiment, the method of this invention provides for tethering nanoparticles to at least one ionic liquid nanoscale ionic material.

This invention further provides for an anode for an electrochemical cell comprising a metal sheet coated with a plurality of organic surface moieties covalently bound to the metal surface, and at least one ionic liquid nanoscale ionic material tethered to at least one surface group.

These and other features of the invention will be further described and exemplified in the drawings and detailed description below.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

DETAILED DESCRIPTION OF THE EMBODIMENT

This invention relates to a hydrophobic, ionically-conductive coating for a metal surface comprising a plurality of organic surface moieties covalently bound to the metal surface, and at least one ionic liquid nanoscale ionic material tethered to at least one surface moiety.

This invention may be represented by the following examples.

EXAMPLES

Preparation of Carbon/Sulfur Composite

Sulfur (10 g) was ball milled for four hours along with 4 g of Ketchen carbon. Then heat treated for 16 hours @165° C. The heat treatment was carried out in a Parr reactor. The sulfur loading was evaluated by thermogravimetric analysis, TGA at 70 wt. %.

Coating of Lithium Metal

Strips of 50 micron thick lithium foil 3.5 in long and 1 in. wide were coated with a UV curable formulation by dip coating at a withdrawal speed of 50 mm/min, inside a glove box filled with argon gas. The dip coater was purchased from the MTI Corporation (Model PTL-MM01). After drying the strip is sealed in a glass jar filled with argon gas and taken outside the glove box to be UV exposed using a Heraeus Fusion Soluva™ at a belt speed of 3 feet/min. The strip is cured twice. The exposure energy at the wavelength of the UV sensitizer (330 nm) was measured by sending a UV Power Puck II manufactured by EIT, Inc. of Sterling, Va., twice under the lamp at 3 ft./min. The exposure power was 8980 mJ/cm2).

Figure 1:
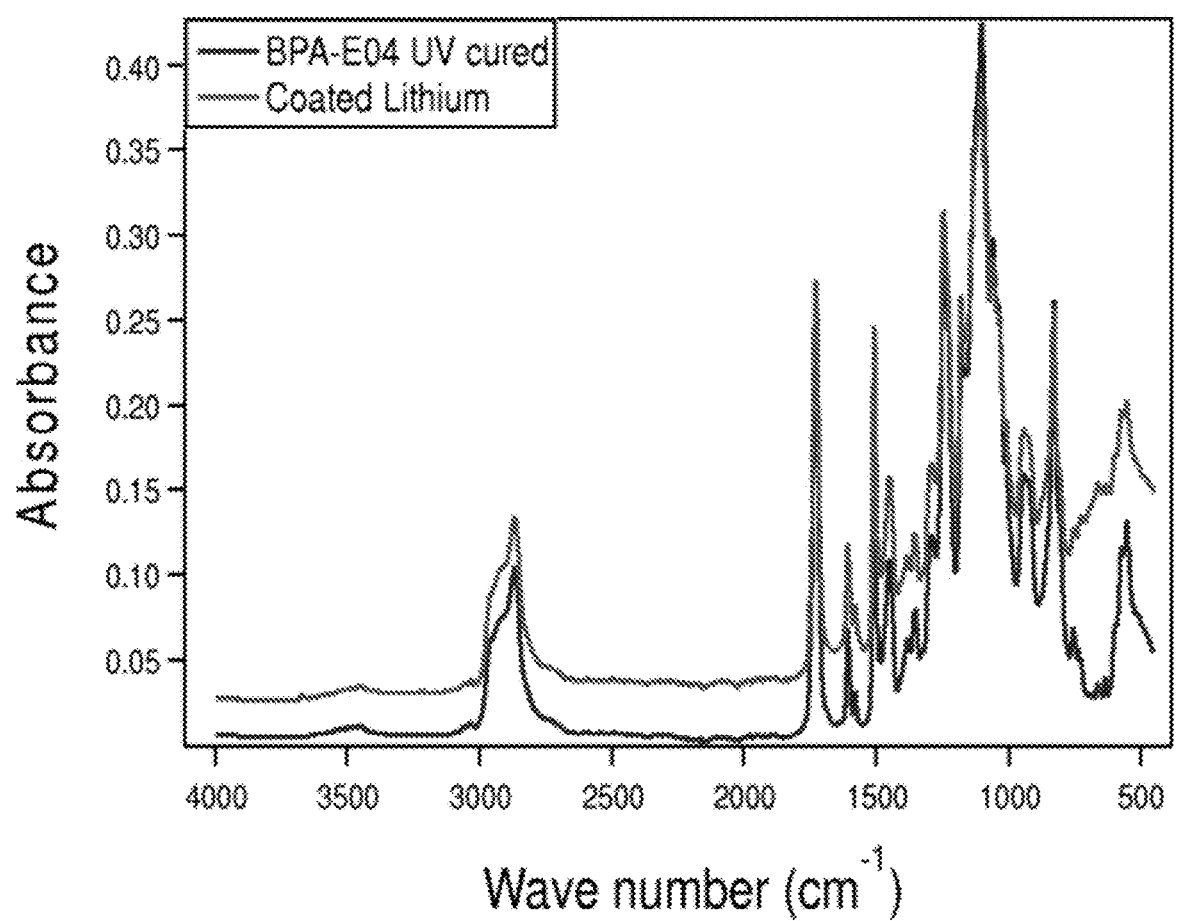
FIG. 1 is a schematic diagram showing a FTIR analysis on the base UV cured polymer films and coated on a Li metal surface.

FIG. 1 compares FTIR results for UV cured polymer films and the lithium protected UV cured polymer films. This indicates the presence of the polymer layer on the surface of the film. The freestanding polymer films were about 30 µm thick and the coatings on the Li metal were aimed at 5 µm thick.

Cathode Preparation 1.4 g of the carbon/sulfur composite prepared as described above was mixed with 0.09 g of graphene, 0.0675 g of super C-nergy Super C65 carbon obtained from Imersys, 0.0675 g of KS-6 carbon from TIMCA1, 0.225 g of a 10% ethanol solution of polyvinyl pyrrolidone (PVP) 360 K MW, 18 grams of 5 mm zirconia beads, and 6 grams of deionized water in a Thinky cup. The mixture was milled for five minutes at 5000 rpm, and the beads removed before coating the ink mixtures coated on a 20 microns carbon-coated aluminum current collector, using a # coating knife on an automatic coater. The coated film was dried for one hour at 80 C.

Coin Cell Preparation

An electrode punch with a rubber mat was used to form 1.5 cm diameter cathodes for CR2032 coin cells. The punched cathode electrodes were weighted, housed in vented aluminum pouches, and dried for 4 hours in an 80° C. vacuum oven and immediately transferred to an argon-purged glove box.

All metal components for coin cell assembly were sonicated in ethanol and oven dried at 80° C. before transfer to the argon-purged glove box. The cell was assembled in this sequence, cathode cap, positive electrode (current collector down), separator, gasket, electrolyte (60 microliters), lithium circle, metallic spacer, wave spring, and anode cap. The electrolyte formulation used for these cells include the solvent mixture: dimethyl ether, DME 2 parts (volume), dioxolane, DOL, 3 parts, and tetra ethylene glycol dimethyl ether, TEGDME, 5 parts. Lithium triflate (0.5 M) and lithium nitrate (0.1 M) salt combination were used.

After assembling, a gentle press down on the anode cap to give a soft closure to the cell. The excess electrolyte was wiped-off to prevent suction on the crimper die. The cell cathode-side down was placed on the crimper, and 800-1000 psi force applied the cell for sealing.

Coin Cell Battery Evaluation

The cells were aged for four hours before testing. A NEWARE Battery Analyzer was used for testing. All cells were tested at a C rate of 0.20 calculated based on theoretical capacity of the sulfur loading and weight of the cathode material.

Free-Standing Films Preparation

Films of the formulations of Table 1 were prepared by placing a few drops between two glass plates, avoiding the trapping of any air bubbles. The glass plates were sent twice under the Heraeus Fusion Soluva™ UV belt curing at a belt speed of 3 feet/min. The isolated films were about 15 to 20 microns thick.

Swelling Experiments

Figure 2:
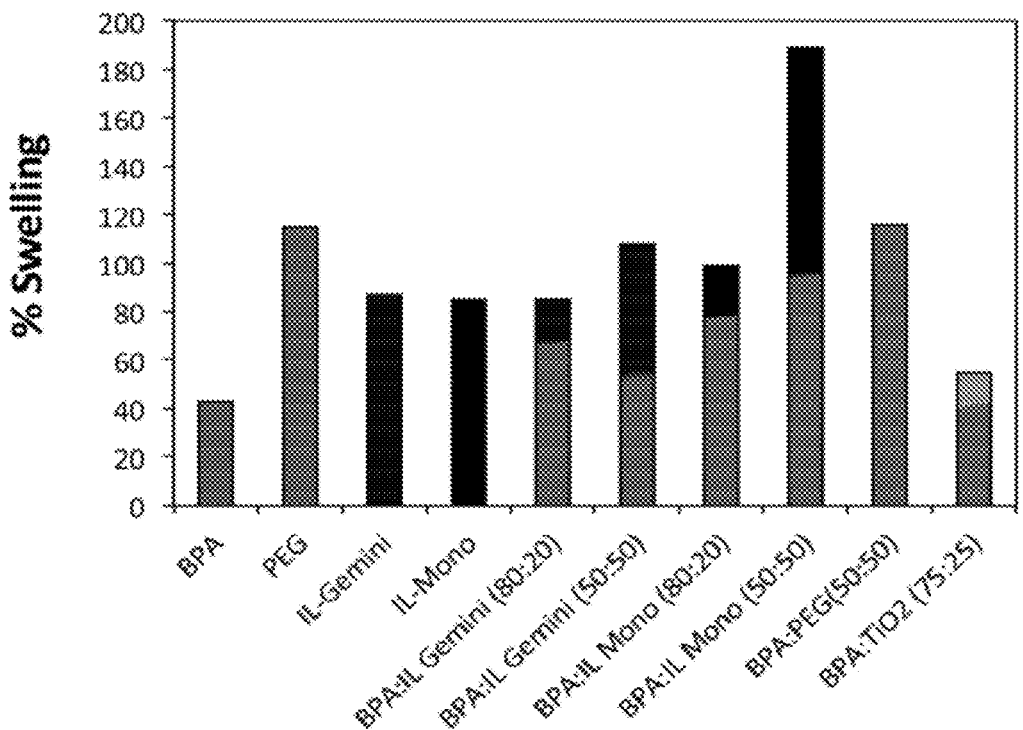
FIG. 2 is a bar graph showing the swelling characteristics of different UV cured polymeric films in DOL:DME solvent.

One sample each of the films were punched into coin separators. Each sample was inserted in a pre-weighted vial. The vial containing the punched film was weighted again. Then the punched film was covered with a 50/50 Wt./Wt. DOL/DOE solvent mixture, sealed and strode for 24 hours. The solvent was then fully drained from the vial leaving a swollen punched film. The vial and the swollen film was weight again. From that data the percent swelling was calculated using the following formula, the results of which are in FIG. 2:

$$\text{Percent swelling} = \frac{\text{Absorbed solvent wt}}{\text{Punched film wt}}$$

Dynamic Mechanical Characterization of Crosslinked Overcoat Films

The free standing films were analyzed by DMA under the following conditions: The samples were cut in 8 mm wide strips and measured in tension using the RSA II DMA with a temperature sweep from 25 to 200 C at 1 Hz with a 5 C/min. heating rate with 1% strain and a static load of 1 gm.

Figure 3:
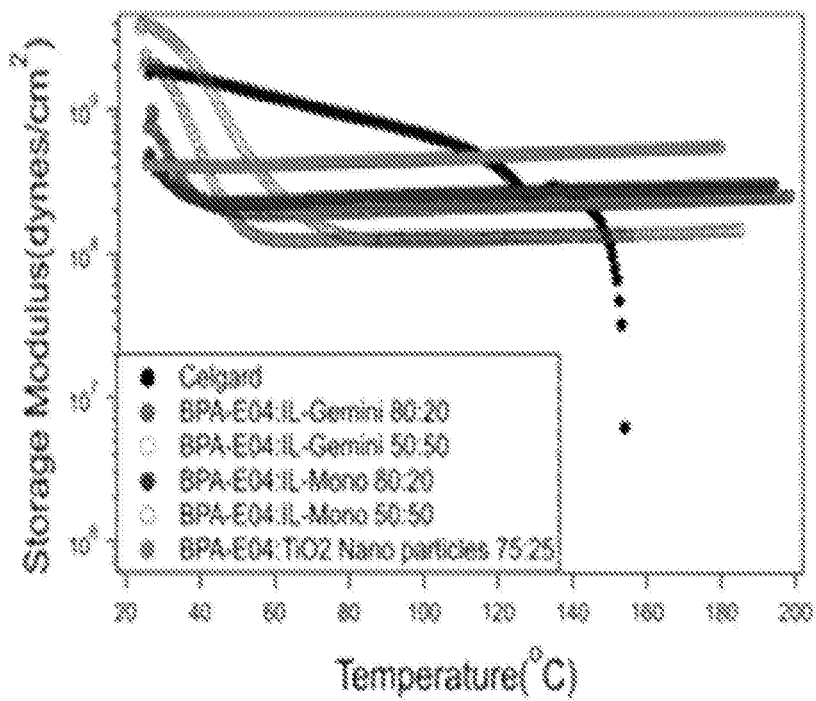
FIG. 3 is a schematic diagram showing the storage modulus as function of temperature for several UV cured polymer films.

As shown in FIG. 3, these films are stable up to at least 200° C., compared to state of the art poly propylene-poly ethylene based separator. Temperature invariant mechanical properties of the separators indicate their ability to inhibit a propagating dendrite front even at elevated temperatures.

Also, mechanical properties of the separators can be easily tuned by adjusting the relative concentrations of cross linker and monomer and curing conditions. The addition of titanium dioxide ($TiO_2$) nanoparticles improved the over mechanical strength of the cured films.

Example 1: Effect of Ionic Liquid Concentration

An overcoat solution was prepared by mixing 7.4 grams of bisphenol A ethoxylate diacrylate, average MW~688 (EO/Phenol 4) obtained from Aldrich Chemicals, and 50 microliters of 2-hydroxy-2 methylpropiophenone UV sensitizer also obtained from Aldrich Chemicals, in 38 grams of dimethoxy ethane (DME) solvent. Two other formulations were mixed introducing the JL3-131 ionic liquid shown below at two concentrations, 20 wt. % and 30 wt. % (Table 1).

TABLE 1

| Formulation | BPA-EO4 | JL3-131 | FL300 | PEG | SMI-58 |
|---|---|---|---|---|---|
| Mixture 1 | 100% | 0% | 0% | 0% | 0% |
| Mixture 2 | 75% | 0% | 25% | 0% | 0% |
| Mixture 3 | 0% | 0% | 0% | 0% | 100% |
| Mixture 4 | 80% | 20% | 0% | 0% | 0% |
| Mixture 5 | 50% | 50% | 0% | 0% | 0% |
| Mixture 6 | 0% | 100% | 0% | 0% | 0% |
| Mixture 7 | 50% | 0% | 0% | 50% | 0% |
| Mixture 8 | 0% | 0% | 0% | 100% | 0% |
| Mixture 9 | 80% | 0% | 0% | 0% | 20% |
| Mixture 10 | 50% | 0% | 0% | 0% | 50% |

Example 2: Cycling Results for the Coin Cells Made from Example 1 are Plotted in FIG. 4

The curve labeled 1 is the specific capacity of the cell using the non-overcoated anode (control). Curve 2 is the specific capacity of the cell using an anode coated with formula 1 (100% BPA-EO4). The specific capacity for that cell dropped substantially compared to the control cell. With the addition of 20% JL3-131 cross linkable ionic liquid to the formulation (formula 2) after a lag at the first five cycles, the specific capacity of the cell gets closed to the control. When the concentration of the ionic liquid is raised to 30%, the specific capacity (curve 4) matches the control at the first five cycles and drops 50 mAh/g in relation to the control.

Chemically-Bound Coating on the Metal Anode

To prepare chemically-bound overcoat coating on the anode metal, the metal are prepared by the following procedure: The surface of the lithium metal is cleaned using pentane solvent with vigorous stirring for 3 minutes. After that, the electrode is quickly dried in the glove box atmosphere. Then the cleaned sample is submerged for 10 seconds in an (3-acryloxypropyl) trichlorosilane or (3-acryloxypropyl) methyl dichlorosilane, or allylmethylchlorosilane, all from Gelest. The treated is then allowed to dry in the glovebox before further coating with one of formulations of Table 1.

Figure 4:
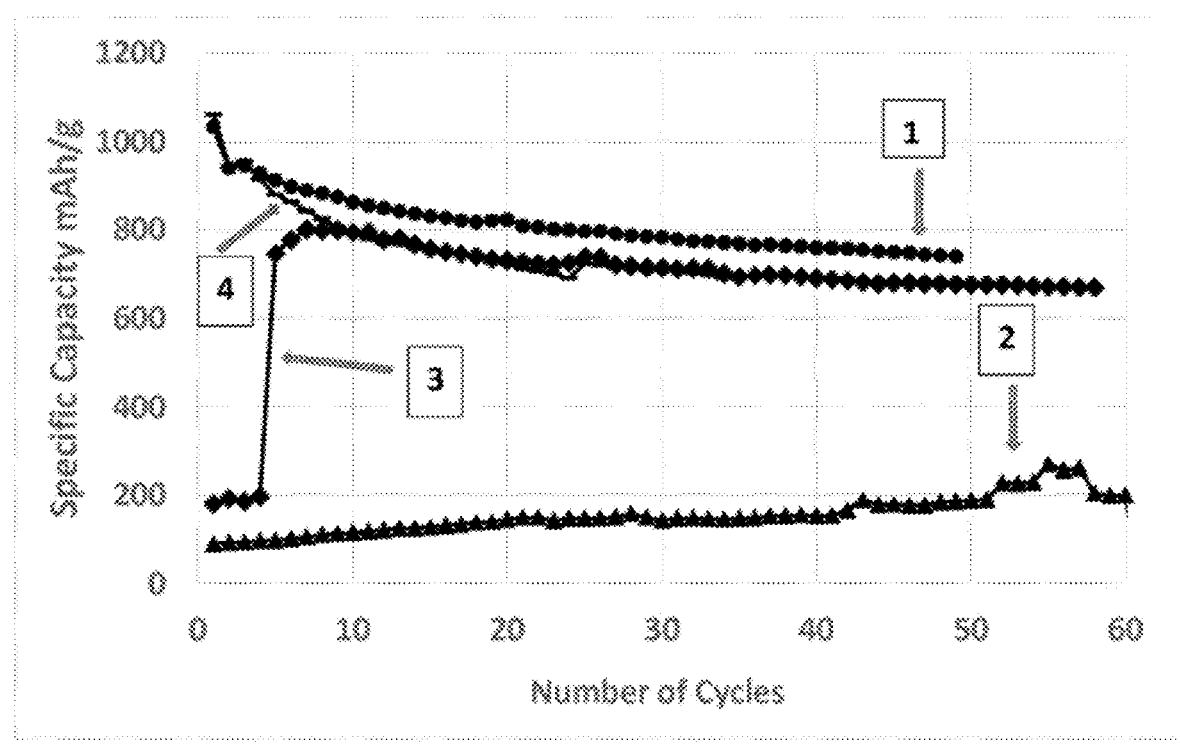
FIG. 4 is a schematic diagram showing the specific capacity of cell using variation of anode coat.
Figure 5:
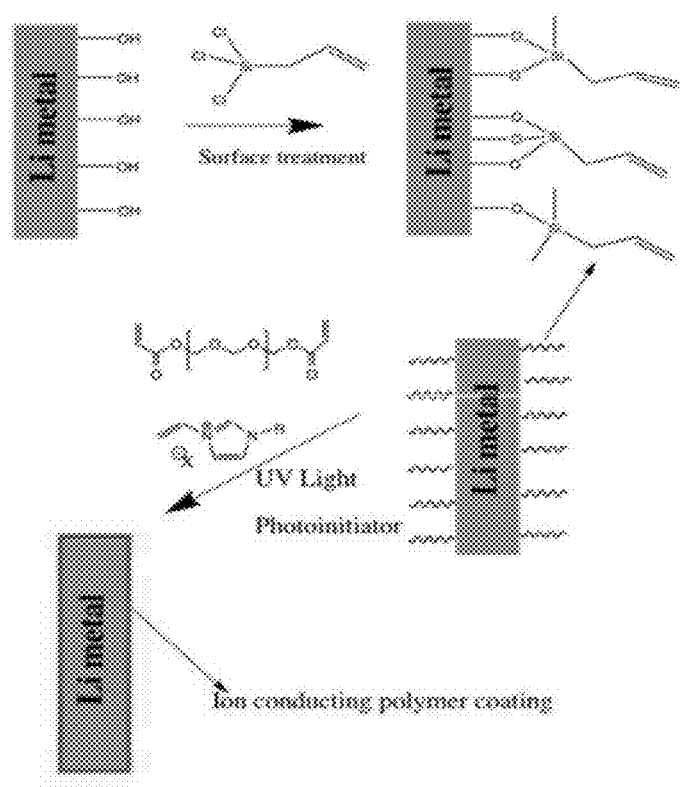
FIG. 5 is a schematic diagram showing a process of providing a radiation cured polymeric layer onto alkali metal electrodes.
Figure 6:
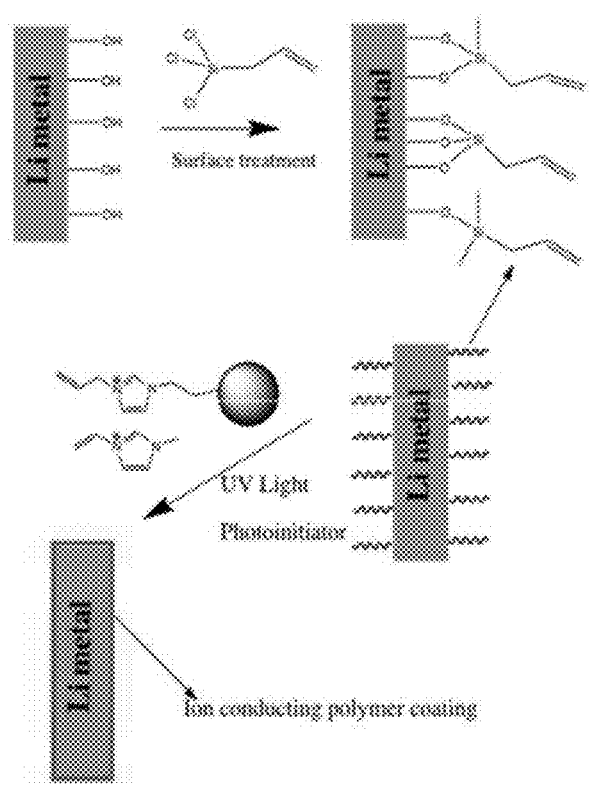
FIG. 6 is another schematic diagram showing a process of providing a radiation cured polymeric layer onto alkali metal electrodes.

With respect to FIG. 4, curve 1 represents the control, with no overcoat, and shows the specific capacity of the cell using the non-overcoated anode (control). Curve 2 represent 100% BPA-E04 overcoat, and shows the specific capacity of the cell using an anode coated with formula 1 (100% BPA-E04). Curve 3 represents 20% JL3-131 and Curve 4 represents 30% JL3-131, and these two curves show the specific capacity of the cells using an anode coated with formulas 2 (20% JL3-131) and 3 (30% JL3-131), respectively. The formulations are also represented in Table 2 below. The specific capacity for that cell dropped substantially compared to the control cell. With the addition of 20% JL3-131 cross linkable ionic liquid to the formulation (formula 2) after a lag at the first five cycles, the specific capacity of the cell gets closed to the control. When the concentration of the ionic liquid is raised to 30%, the specific capacity (curve 4) matches the control at the first five cycles and drops 50 mAh/g in relation to the control.

TABLE 2

|  | BPA-E04 diacrylate | JL3-131 Ionic Liquid | UV Sensitizer | Solvent | % Solid |
| --- | --- | --- | --- | --- | --- |
| Formula 1 | 100 wt. % | 0 wt. % | 50 microliter | DME | 16.3 wt. % |
| Formula 2 | 80 wt. % | 20 wt. % | 50 microliter | DME | 16.3 wt. % |
| Formula 3 | 70 wt. % | 30 wt. % | 50 microliter | DME | 16.3 wt. % |

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An ionically-conductive coated alkaline or alkaline earth metal surface comprising:
   a plurality of organic surface moieties comprising silicon covalently bound by an oxygen to a lithium, sodium, magnesium or aluminum metal surface, and
   at least one hydrophobic ionic liquid material comprising a ceramic particle tethered to at least one of the plurality of organic surface moieties covalently bound by an oxygen to the metal surface, wherein the at least one hydrophobic ionic liquid material comprises an organic cation, anion, a functionalized site and a hydrophobic site, wherein the ionic liquid material is polymerized through the functionalized site to at least one of the plurality of organic surface moieties, so as to form a hydrophobic, ionically-conductive coating comprising a hydrophobic outer surface and being covalently attached to the metal surface.

2. The coating of claim 1 wherein the metal is an anode electrode.

3. The coating of claim 1 wherein the metal is lithium.

4. The coating of claim 1 wherein the tethered ceramic particle has a size range from 5 nm to 1 um.

5. The coating of claim 1 wherein the size of the tethered ceramic particle is about 10 nm.

6. The coating of claim 4 wherein the tethered ceramic particle comprises nanoparticle materials.

7. The coating of claim 1 wherein the tethered surface moieties are partially cross-linked to ionic liquid materials.

8. The coating of claim 1 wherein the ionic liquid material is a nanoscale ionic material.

9. The coating of claim 1 wherein the partially cross-linked liquid materials are nanoscale ionic materials.

10. A method of making an ionically-conductive coating having a hydrophobic outer surface, on a metal surface which comprises:
    a) providing the metal surface with hydroxyl binding sites;
    b) covalently bonding organic surface moieties comprising silicon and an organic site to the hydroxyl binding sites through the silicon to provide a metal-O—Si bond;
    c) crosslinking at least one hydrophobic ionic liquid material to the metal-O—Si bond by combining the at least one hydrophobic ionic liquid material with a UV sensitizer and at least 50 wt. % of an acrylate crosslinker based on the coating and subjecting the mixture to ultraviolet radiation, resulting in an ionically-conductive coating comprising an ionic liquid polymer, having a hydrophobic outer surface and being covalently attached to the metal surface, wherein the ionic liquid material comprises an organic cation, anion, a functionalized site and a hydrophobic site.

11. The method of claim 10 which comprises treating the metal surface to increase the number of binding sites prior to binding.

12. The method of claim 10 comprises wherein the ionic liquid material is a nanoscale ionic material.

13. The method of claim 10 wherein the organic surface moieties comprise a nanoparticle.

14. The method of claim 10 wherein the metal surface is lithium, sodium, magnesium or aluminum.

* * * * *